US010586452B2

(12) United States Patent
Kapinos et al.

(10) Patent No.: US 10,586,452 B2
(45) Date of Patent: Mar. 10, 2020

(54) TRANSMISSION OF PARKING INSTRUCTIONS WITH CLEARANCE DISTANCES TO SELF-DRIVING VEHICLES

(71) Applicant: Lenovo (Singapore) Pte. Ltd., Singapore (SG)

(72) Inventors: Robert J. Kapinos, Durham, NC (US); Timothy W. Kingsbury, Cary, NC (US); Scott W. Li, Cary, NC (US); Russell S. VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 214 days.

(21) Appl. No.: 15/784,160

(22) Filed: Oct. 15, 2017

(65) Prior Publication Data

US 2019/0114917 A1  Apr. 18, 2019

(51) Int. Cl.
| | | |
|---|---|---|
| *G06F 7/70* | (2006.01) | |
| *G08G 1/14* | (2006.01) | |
| *G08G 1/16* | (2006.01) | |
| *G06Q 20/12* | (2012.01) | |
| *G06Q 20/32* | (2012.01) | |
| *G07F 17/00* | (2006.01) | |
| *G07F 17/24* | (2006.01) | |
| *G06Q 20/14* | (2012.01) | |
| *G06Q 30/02* | (2012.01) | |

(52) U.S. Cl.
CPC .......... *G08G 1/143* (2013.01); *G06Q 20/127* (2013.01); *G06Q 20/145* (2013.01); *G06Q 20/3224* (2013.01); *G07F 17/0057* (2013.01); *G07F 17/246* (2013.01); *G08G 1/146* (2013.01); *G08G 1/162* (2013.01); *G08G 1/165* (2013.01); *G08G 1/168* (2013.01); *G06Q 20/14* (2013.01); *G06Q 30/0284* (2013.01)

(58) Field of Classification Search
CPC ........ G08G 1/143; G08G 1/146; G08G 1/168; G08G 1/162; G08G 1/165; G06Q 30/0284; G06Q 20/14
USPC .............. 701/117, 23, 25; 348/148; 414/231
See application file for complete search history.

(56) References Cited

U.S. PATENT DOCUMENTS

| | | | | |
|---|---|---|---|---|
| 2012/0072067 A1* | 3/2012 | Jecker | ................ | B62D 15/0285 701/25 |
| 2014/0371972 A1* | 12/2014 | Jecker | .................. | B62D 15/027 701/23 |
| 2015/0149265 A1* | 5/2015 | Huntzicker | ........... | B60W 30/06 705/13 |
| 2015/0213715 A1* | 7/2015 | Schulz | .................... | G08G 1/144 340/932.2 |
| 2018/0211539 A1* | 7/2018 | Boss | ...................... | G08G 1/168 |
| 2018/0354502 A1* | 12/2018 | Yaldo | ................... | G05D 1/0088 |

* cited by examiner

*Primary Examiner* — Shardul D Patel
(74) *Attorney, Agent, or Firm* — VanLeeuwen & VanLeeuwen; Jason A. Friday

(57) ABSTRACT

An approach is disclosed that locates available parking spaces from a set of parking spaces, such as in a parking lot. The approach retrieves a clearance distance that needed between a parked vehicle parked in an adjacent parking space to the identified parking space. After retrieving the needed clearance distance, the system transmit an instruction to a self-driving vehicle to park in the identified parking space and leave the clearance distance between the self-driving vehicle and the parked vehicle.

20 Claims, 7 Drawing Sheets

TRANSMISSION OF PARKING INSTRUCTIONS WITH CLEARANCE DISTANCES TO SELF-DRIVING VEHICLES

BACKGROUND

Parking space size requirements are different for manually driven vehicles and self-driving vehicles. Vehicles that are parking without human occupants can optimize parking space usage by parking extremely close to one another. Without humans, there is no need to be able to open the doors. Additionally, self-driving vehicles can maneuver extremely close to one another without colliding. In a mixed parking environment, if a self-driving vehicle parks too close to a vehicle with human occupants, there will be problems for the occupants when exiting the vehicle or when driving away from the parking space.

SUMMARY

An approach is disclosed that locates available parking spaces from a set of parking spaces, such as in a parking lot. The approach retrieves a clearance distance that needed between a parked vehicle parked in an adjacent parking space to the identified parking space. After retrieving the needed clearance distance, the system transmit an instruction to a self-driving vehicle to park in the identified parking space and leave the clearance distance between the self-driving vehicle and the parked vehicle.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
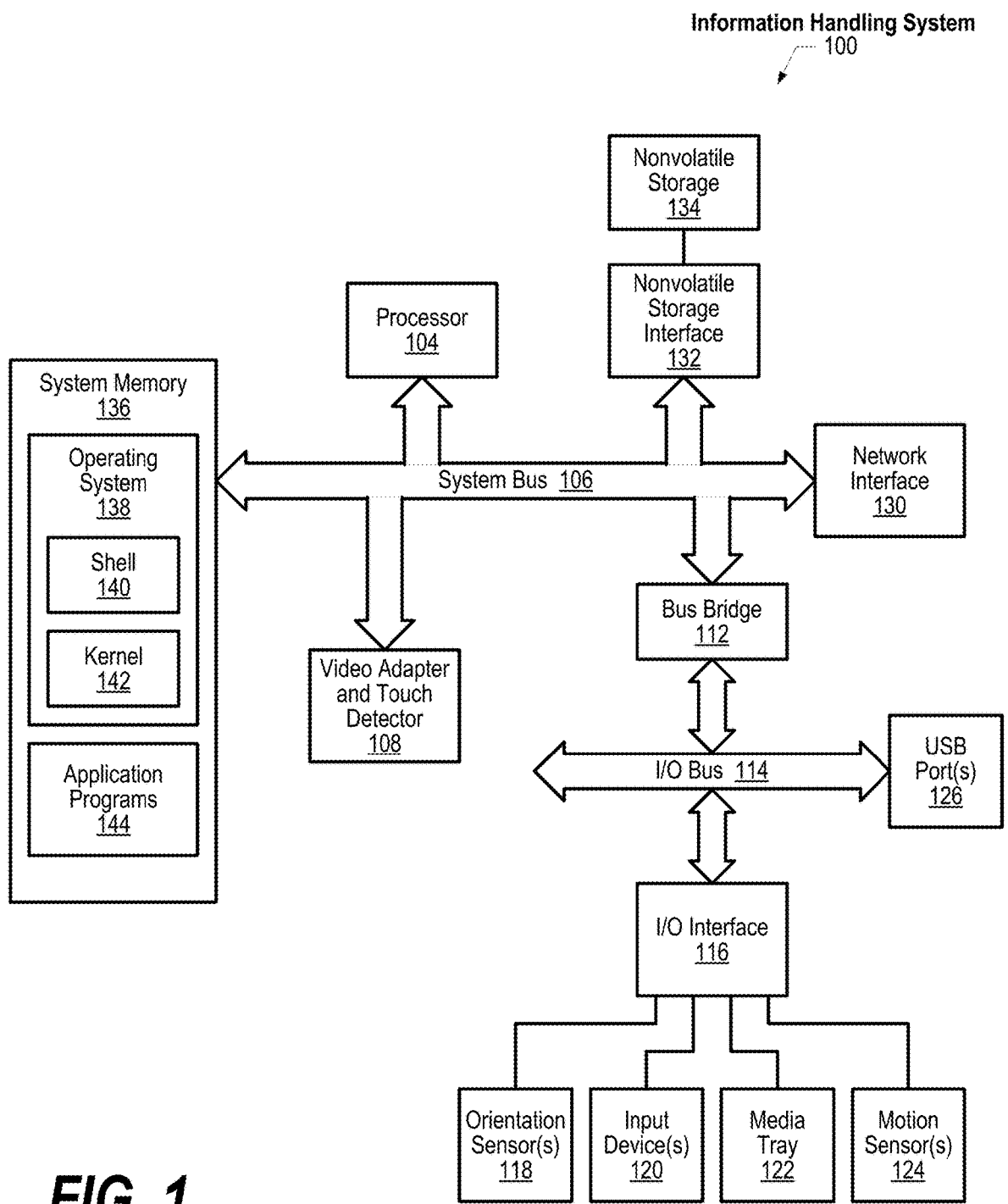
FIG. 1 is a block diagram of a data processing system in which the methods described herein can be implemented.

FIGS. 1-7 show an approach used to manage a mixed-use parking lot that includes both self-driving and manually driven vehicles. Optimal parking space usage in a parking lot that contains a mixed combination of self driving cars with human passengers, self driving cars with no passengers, and manually driven cars is achieved by using wireless communication between self-driving cars. Where capable, each car reports information about its self-driving capability and the seating position of occupants (if any). Each possible combination can be identified and handled differently. First, if a self-driving car with no occupants parks next to another self-driving car with no occupants, then the two cars can park extremely close to one another. Second, if a self-driving car with no occupants parks next to another self-driving car that has passengers that are expected to return, then there will need to be adequate space for the people to re-enter the vehicle. The number of occupants and which doors they will use may create an opportunity to park extremely close on one side of the vehicle. Third, if a self-driving car with no occupants parks next to a manually driven car, then appropriate clearances are included for the manually operated car doors. A more advanced manually operated car may be able to report its number of occupants and which doors they will need to use. This might create the opportunity to park very close on one side of the vehicle. Finally, fourth, manually driven cars are able to park in a conventional manner with space for opening and closing doors. An advanced manual car may provide additional information to the driver about the requirements of nearby self-driving parked cars. Optionally, a manual driver may choose to park very close to a self-driven car that does not have passengers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
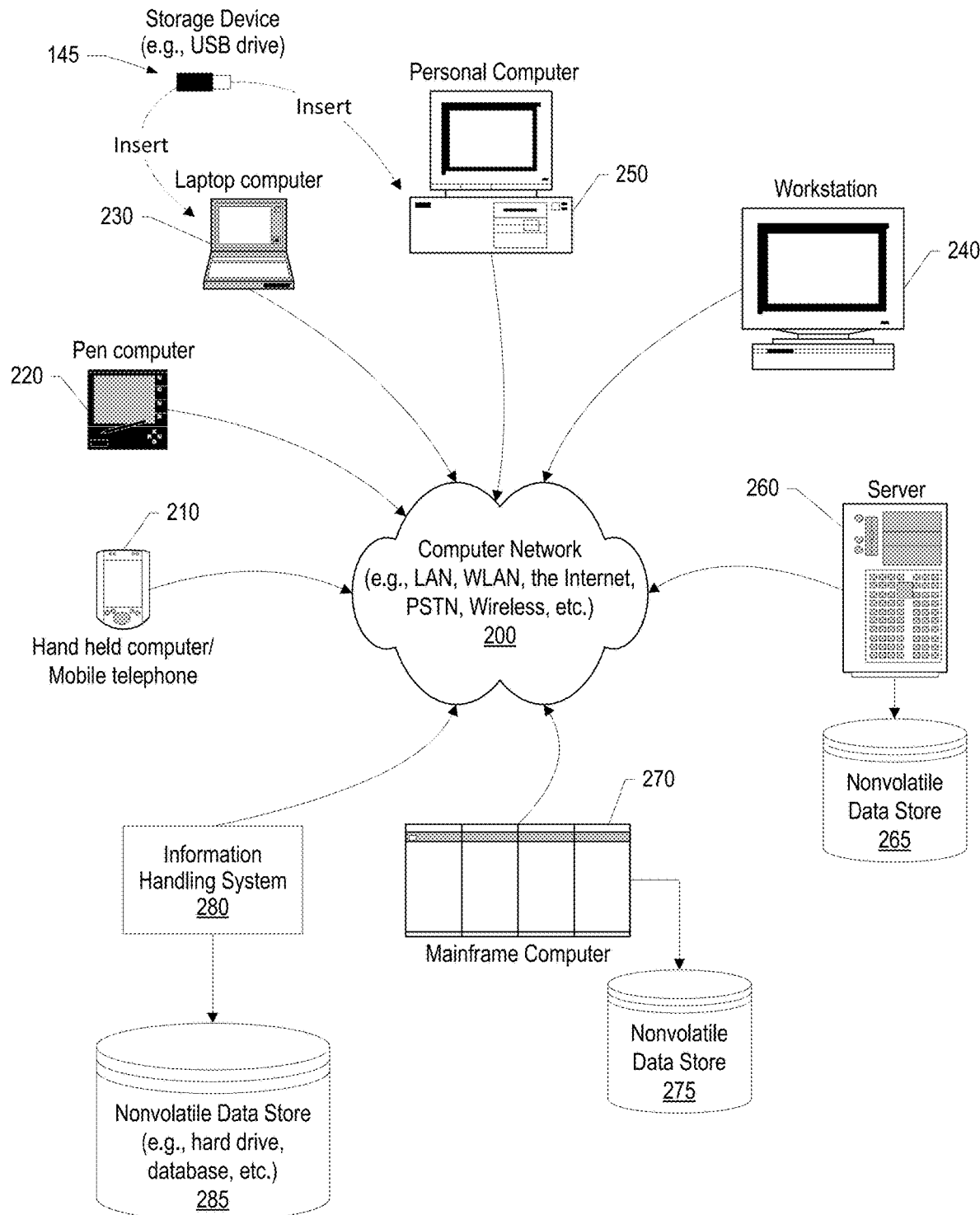
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Note that some or all of the exemplary architecture, including both depicted hardware and software, shown for and within information handling system 100 may be utilized by a software deploying server, such as one of the servers shown in FIG. 2.

Information handling system 100 includes processor 104 that is coupled to system bus 106. Processor 104 may utilize one or more processors, each of which has one or more processor cores. Video adapter 108, which drives/supports touch screen display 110, is also coupled to system bus 106. System bus 106 is coupled via bus bridge 112 to input/output (I/O) bus 114. I/O interface 116 is coupled to I/O bus 114. I/O interface 116 affords communication with various I/O devices, including orientation sensor 118, input device(s) 120, media tray 122 (which may include additional storage devices such as CD-ROM drives, multi-media interfaces, etc.), motion sensor 124, and external USB port(s) 126. Input devices 120 may include keyboards, mice, trackpads/trackballs, and other devices that provide input to the system through I/O interface 116.

Motion sensor(s) 124 include one or more sensors and/or associated logic that senses the direction, speed, and/or acceleration of movement of information handling system 100 and components such as the keyboard layer, touch layer, and display screen layer. For example, a combination of accelerometers, strain gauges, etc. (described above with respect to orientation sensor 118) can also be used to detect how fast and in what direction information handling system 100 or the individual components is moving, as well as the acceleration of movement of information handling system 100 or the individual components. For example, motion sensor 124, either alone or in combination with the orientation sensor 118 described above, is able to detect if information handling system 100 is being handed from one person to another based on the rate of acceleration during the hand-off (e.g., faster than normal walking acceleration), the yaw orientation of information handling system 100 during the hand-off (e.g., a rotating movement indicating that the computer is being turned around for another person to see during a hand-off of the computer from one person to another), the pitch orientation of information handling system 100 during the hand-off (e.g., the front of information handling system 100 being tilted upwards during the hand-off of the computer from one person to another), and/or the roll orientation of information handling system 100 during the hand-off (e.g., a side of the computer rolling upwards during the hand-off of the computer of the computer from one person to another). In one embodiment, motion sensor 124 (alone or in combination with orientation sensor 118) is able to detect an oscillating motion of information handling system 100, such as that motion created with a user is walking and holding a tablet computer in her hand (and at her side) while swinging her arms forward and backward. In addition, motion sensors 124 is able to detect the movement of one or more of the layers included in the information handling system (keyboard layer 310, touch layer 320, and display screen layer 330). For example, motion sensors 124 can detect if the user is moving the touch layer in a direction to overlay the keyboard layer or the display screen layer. Likewise, motion sensors can detect that the user is moving the layers to position the information handling system in a traditional laptop orientation, a tablet orientation, a clamshell or "transport" orientation, or any other orientation possible with the information handling system. Information handling system 100 may be a tablet computer, a laptop computer, a smart phone, or any other computing device that has a keyboard layer, a touch layer, and a display screen layer.

Nonvolatile storage interface 132 is also coupled to system bus 106. Nonvolatile storage interface 132 interfaces with one or more nonvolatile storage devices 134. In one embodiment, nonvolatile storage device 134 populates system memory 136, which is also coupled to system bus 106. System memory includes a low level of volatile memory. This volatile memory also includes additional higher levels of volatile memory, including cache memory, registers and buffers. Data that populates system memory 136 includes information handling system 100's operating system (OS) 138 and application programs 144. OS 138 includes a shell 140, for providing transparent user access to resources such as application programs 144. As depicted, OS 138 also includes kernel 142, which includes lower levels of functionality for OS 138, including providing essential services required by other parts of OS 138 and application programs 144, including memory management, process and task management, disk management, and mouse and keyboard management.

The hardware elements depicted in information handling system 100 are not intended to be exhaustive, but rather are representative to highlight essential components required by the present invention. For instance, information handling system 100 may include alternate memory storage devices such as magnetic cassettes, digital versatile disks (DVDs), Bernoulli cartridges, and the like. These and other variations are intended to be within the spirit and scope of the present invention.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
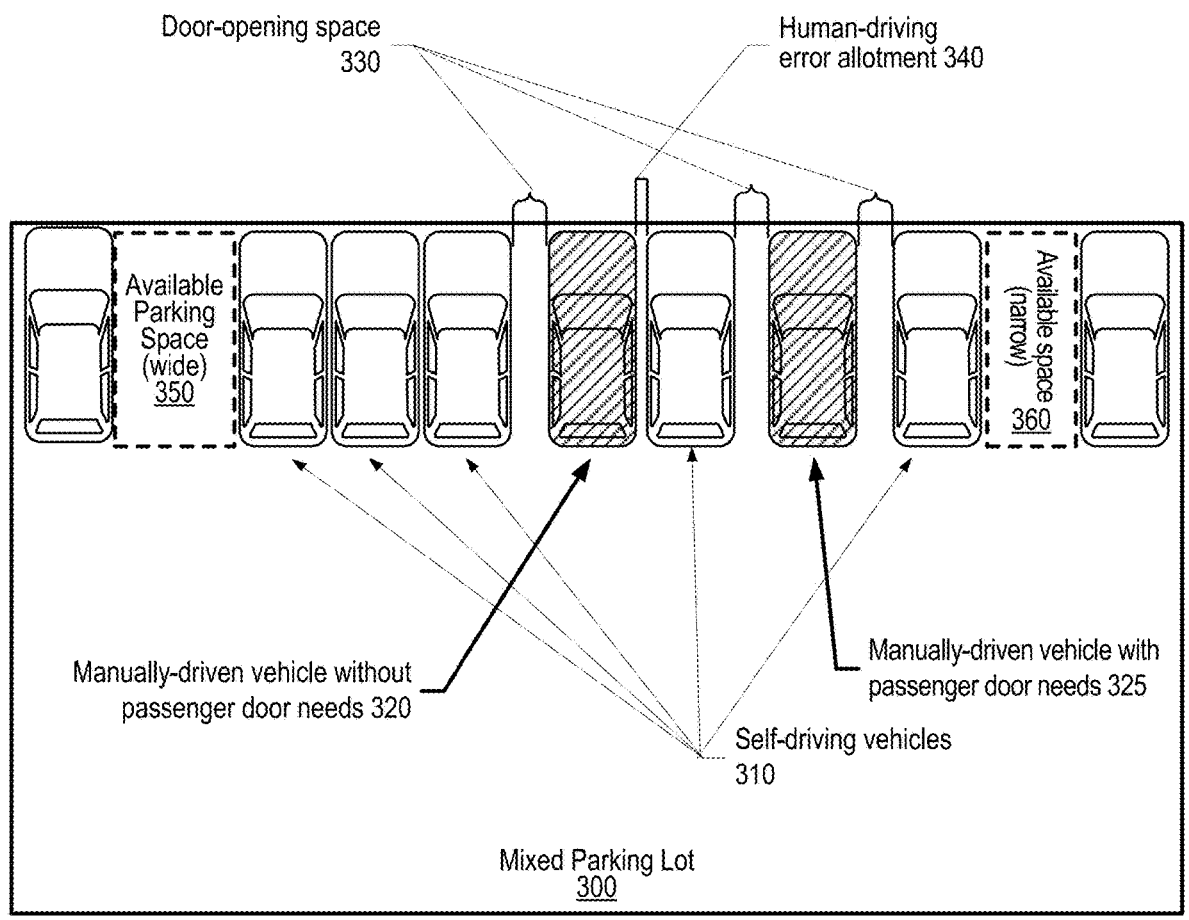
FIG. 3 is a diagram depicting a mixed-use parking lot environment with both self-driving and manually driven vehicles.

FIG. 3 is a diagram depicting a mixed-use parking lot environment with both self-driving and manually driven vehicles. Mixed use parking lot 300 is a parking lot where both manually driven vehicles 320 and 325 and self-driving vehicles 310 park in available spaces. Space is provided between the various vehicles based on the clearance distance that is needed. When a vehicle enters the lot, the process locates an available parking space. In the example, two empty parking spaces are available for vehicles entering the lot, spaces 350 and 360. Available parking space 350 is a wider parking space that is shown between two self-driving cars, while available parking space 360 is a narrow parking space that is also positioned between two self-driving cars. In the example, there are currently two manually-driven vehicles in the parking lot—vehicles 320 and 325. Vehicle 320 has door-opening clearance distance 330 on the driver's side of the vehicle to allow the opening of the driver's door with a small clearance distance (human-driving error allotment clearance distance 340) on the passenger side. In one embodiment, self-driving vehicles are parked with a nominal distance between each of the self-driving vehicles because these vehicles are not likely to collide when parking or exiting the space, while manually-driven vehicles are given a larger clearance distance on the passenger side of the vehicle even if there are no passengers since human error is more susceptible to collisions if the vehicles are parked too closely together. Manually driven vehicle 325 is shown with a door-opening clearance distance on both sides of the vehicle to allow the opening of doors on both the driver's side of the vehicle as well as the passenger side of the vehicle.

Available parking spaces 350 and 360 are shown with parking space 350 being wider and, thus, likely to accommodate a manually driven vehicle with at least one door-opening clearance distance between the manually driven vehicle and the vehicle parked to the driver's side of the space. On the other hand, available parking space 360 is quite narrow and would likely only accommodate a self-driving vehicle that has no need for a door opening clearance distance between the self-driving vehicle and the vehicle on either side of the vehicle parking in space 360.

In one embodiment, space is optimized so that a vehicle entering the lot is assigned a space that best fits the entering vehicle based on its door clearance distances, if any, and the door clearance distances, if any, of the vehicles parked on either side of the parking space. For example, if only spaces 350 and 360 are available and a self-driving vehicle enters the lot, then the entering self-driving vehicle would be assigned to space 360 rather than 350 because, while the self-driving vehicle fits in both spaces, it fits in space 360 with less unnecessary space between the vehicles, thereby saving space 350 for another vehicle that might need additional clearance distances, such as found in a manually driven vehicle. In this case, the process would transmit an instruction to the self-driving vehicle to have the self-driving vehicle park in space 360.

On the other hand, if a manually-driven vehicle enters the lot and both spaces 350 and 360 are available, then the process would recognize that the manually-driven vehicle will not fit into space 360 with adequate clearance distance between the vehicle and the vehicle already parked in the space to the driver's side of space 360. In this case, space 350 would be assigned to the manually-driven vehicle entering the lot and space 360 would still be available for a self-driving vehicle.

Figure 4:
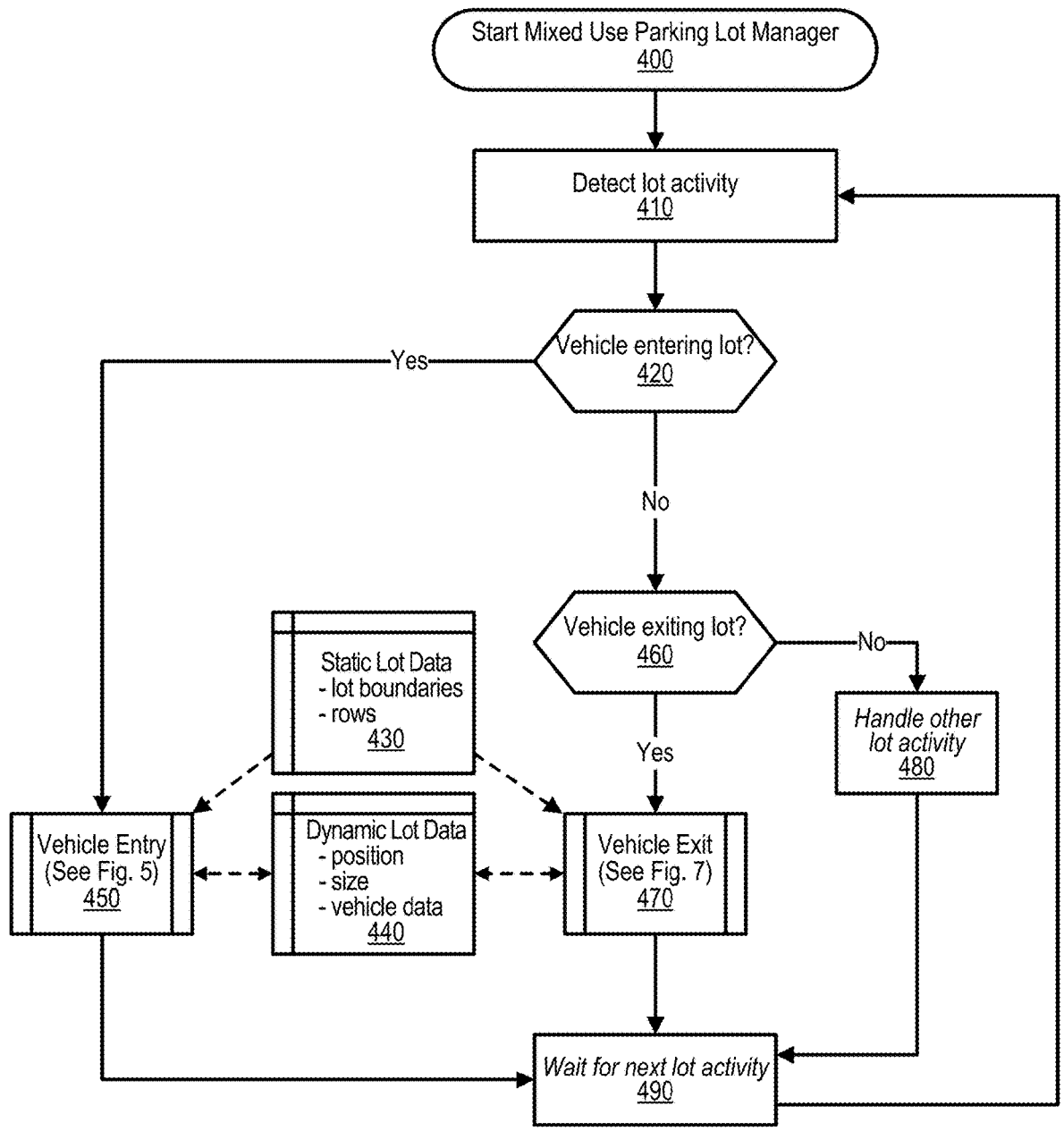
FIG. 4 is a flowchart showing steps taken to manage a mixed-use parking lot environment with both self-driving and manually driven vehicles.

FIG. 4 is a flowchart showing steps taken to manage a mixed-use parking lot environment with both self-driving and manually driven vehicles. FIG. 4 processing commences at 400 and shows the steps taken by a high level process that manages use of a mixed use parking lot used by both self-driving and manually-driven vehicles. At step 410, the process detects lot activity. The process determines whether the lot activity is a vehicle entering the parking lot (decision 420). If the lot activity is a vehicle entering the parking lot, then decision 420 branches to the 'yes' branch to perform predefined process 450. On the other hand, if the lot activity is not a vehicle entering the parking lot, then decision 420 branches to the 'no' branch to perform other steps. At predefined process 450, the process performs the vehicle entry routine to find available spaces in the lot suitable for the vehicle that is entering the lot (see FIG. 5 and corresponding text for processing details). Predefined process 450 uses static parking lot properties read from memory area 430 to identify parking lot boundaries and the rows within the parking lot. In addition, predefined process 450 updates dynamic parking lot data stored in memory area 440 with the position of the vehicles parked in the parking lot, the size of the available spaces, and the vehicle data including whether the vehicle is self- or manually-driven, the actual width of the vehicles, and the clearance distances required between each of the vehicles and any vehicles that is, or might become, parked adjacent to the vehicle. When the lot activity is not a vehicle entering the parking lot, then decision 420 branches to 'no' branch whereupon the process next determines whether the activity is a vehicle exiting the parking lot (decision 460). If the activity is a vehicle exiting the parking lot, then decision 460 branches to the 'yes' branch whereupon, at predefined process 470 the process performs the vehicle exit routine (see FIG. 7 and corresponding text for processing details). On the other hand, if the activity is not a vehicle exiting the parking lot, then decision 460 branches to the 'no' branch whereupon, at step 480, the process handles some other activity that was detected in the parking lot. Predefined process 460 uses static parking lot properties read from memory area 430 to identify parking lot boundaries and the rows within the parking lot. In addition, predefined process 460 updates dynamic parking lot data stored in memory area 440 with the updated position of the vehicles parked in the parking lot, the size of the available spaces, and the vehicle data including whether the vehicle is self- or manually-driven, the actual width of the vehicles, and the clearance distances required between each of the vehicles and any vehicles that is, or might become, parked adjacent to the vehicle. When a vehicle exits the lot, predefined process 440 identifies the newly created empty space and the empty space's width in memory area 440 so that such empty spaces can be utilized by vehicles entering the lot. After the detected lot activity has been handled as described above, then at step 490, the process waits for next lot activity. When the next activity is detected, processing loops back to step 410 to handle the next activity detected as described above.

Figure 5:
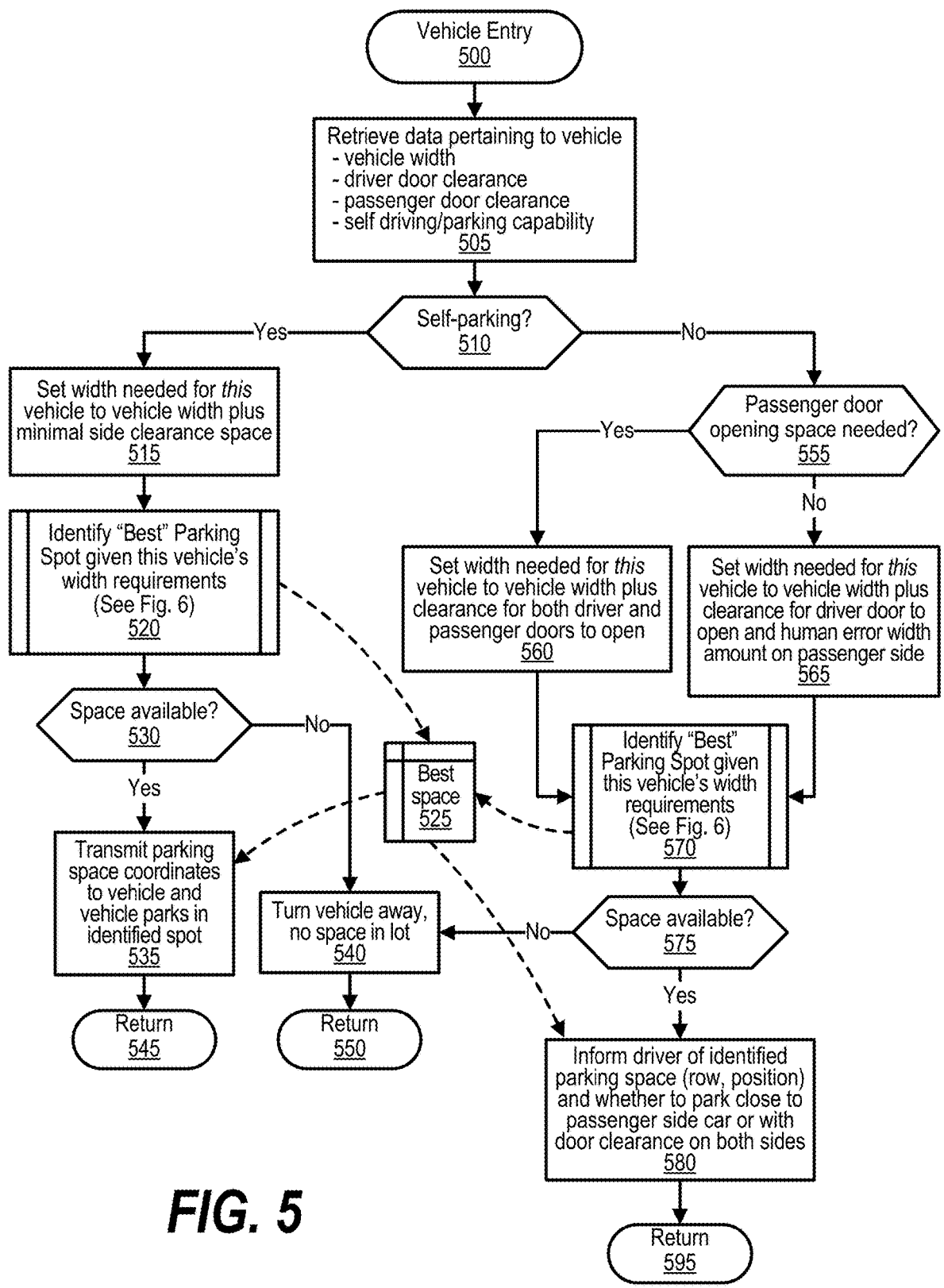
FIG. 5 is a flowchart showing steps taken when a vehicle enters the parking lot.

FIG. 5 is a flowchart showing steps taken when a vehicle enters the parking lot. FIG. 5 processing commences at 500 and shows the steps taken by a process that occurs when a vehicle enters the parking lot. At step 505, the process retrieves data pertaining to the vehicle entering the parking lot. This data includes the vehicle width, the driver door clearance distance, the passenger door clearance distance, and whether the vehicle is capable of self driving or is a traditional manually driven vehicle. The process determines as to whether the vehicle is a self-driving vehicle capable of self parking (decision 510). If the vehicle is a self-driving vehicle, then decision 510 branches to the 'yes' branch to perform steps 515 through 550. On the other hand, if the vehicle is not a self-driving vehicle, then decision 510 branches to the 'no' branch to perform steps 555 through 595. If the vehicle is a self-driving vehicle, then steps 515 through 550 are performed. At step 515, the process sets width needed for this vehicle to this vehicle's actual width plus minimal side clearance distances (e.g., three inches, etc.) on either side of the vehicle. Minimal clearance distances can be set because the self driving vehicle is not likely to collide with other vehicles even when minimal clearances are used. The minimal clearance distance can be adjusted based upon how advanced the self driving technology is in the vehicle with those vehicles having more advanced self driving technology being able to utilize a smaller clearance distance than those vehicles with less advanced technology. At predefined process 520, the process performs the Identify "Best" Parking Spot routine given this vehicle's width requirements (see FIG. 6 and corresponding text for processing details). Predefined process 520 stores the identified optimal parking space identification in memory area 525. The process determines as to whether predefined process 520 found space available to adequately park the self-driving vehicle that has entered the parking lot (decision 530). If space is available, then decision 530 branches to the 'yes' branch whereupon, at step 535, the process wirelessly transmits the parking space coordinates to the self-driving vehicle and the self-driving vehicle parks in the identified spot with the parking space coordinates being retrieved from memory area 525. The coordinates provided to the self-driving vehicle provide for whatever clearances are needed for vehicles currently parked adjacent to the parking space that is assigned to this self driving vehicle, and processing returns to the calling routine at 545. On the other hand, if space is not available in the lot, then decision 575 branches to the 'no' branch whereupon, at step 540, the vehicle is turned away or the vehicle is instructed to wait until a parking space becomes available in the lot, and processing returns to the calling routine at 550.

If the vehicle is a manually-driven vehicle, then steps 555 through 595 are performed. The process determines whether passenger door opening clearance distance is needed for passengers in the vehicle (decision 555). If passenger door opening clearance distance space is needed, then decision 555 branches to the 'yes' branch whereupon, at step 560, the process sets the clearance distance needed for this vehicle to the vehicle's actual width plus a clearance distance for both the driver's and passenger's doors to open. On the other hand, if passenger door opening clearance distance space is not needed, then decision 555 branches to the 'no' branch whereupon, at step 565, the process sets the clearance distance needed for this vehicle to the vehicle's actual width plus a clearance distance for the driver's door to open and a human error width distance amount (e.g., twelve inches, etc.) on the passenger's side of the vehicle. At predefined process 570, the process performs the Identify "Best" Parking Spot routine given this vehicle's width requirements (see FIG. 6 and corresponding text for processing details). Predefined process 570 stores the identified optimal parking space identification in memory area 525. The process determines as to whether predefined process 570 found space available to adequately park the self-driving vehicle that has entered the parking lot (decision 575). If space is available, then decision 575 branches to the 'yes' branch whereupon, at step 580, the process informs driver of the identified parking space (row, position, etc.) and whether the driver is to park close to passenger side the vehicle or with door clearance distance on both sides of the vehicle. The parking space coordinates are retrieved from memory area 525. FIG. 5 processing thereafter returns to the calling routine (see FIG. 4) at 595. On the other hand, if space is not available for the vehicle, then decision 575 branches to the 'no' branch whereupon, at step 540, the vehicle is turned away from the parking lot or asked to wait until space becomes available, and processing returns to the calling routine at 550.

Figure 6:
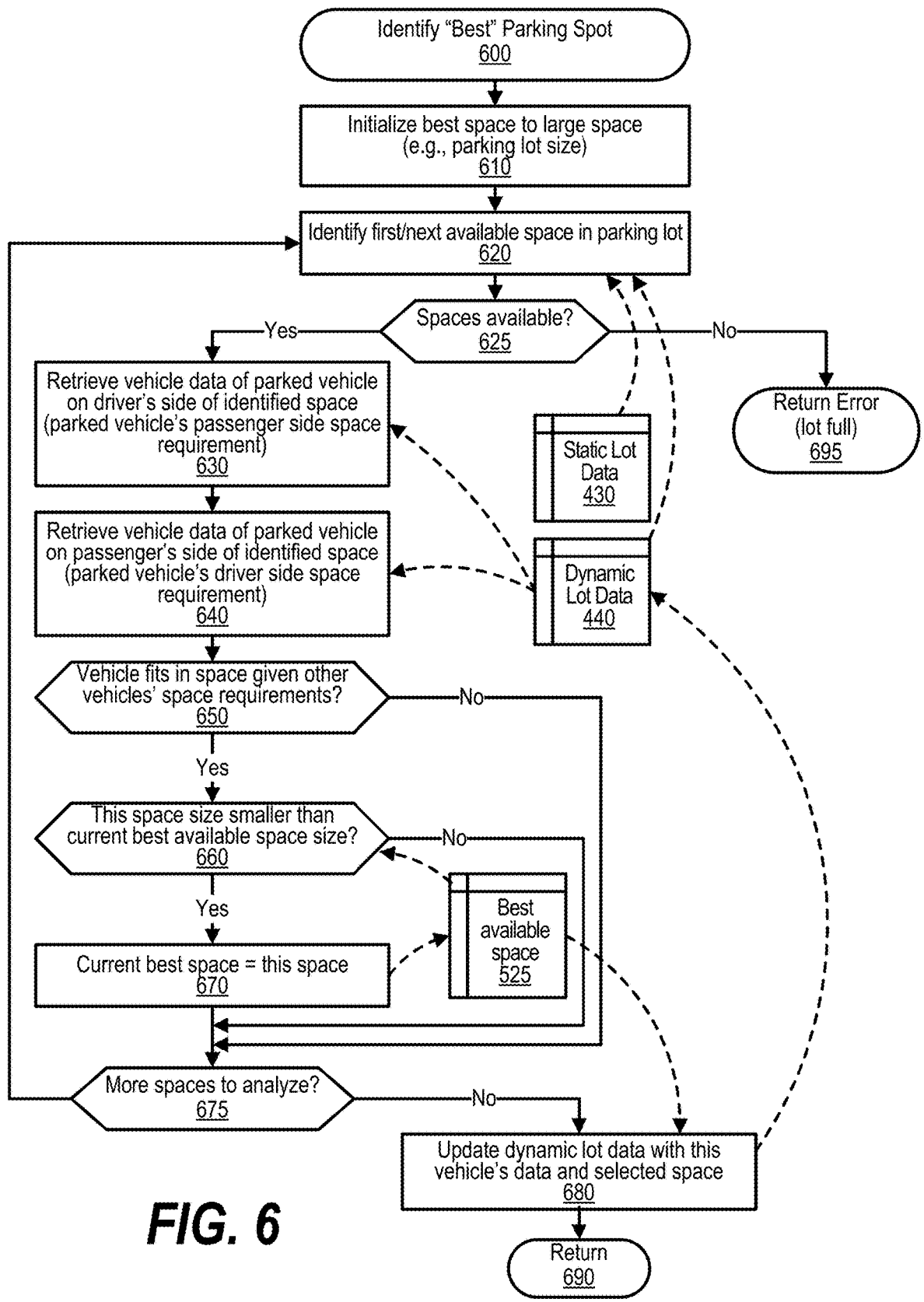
FIG. 6 is a flowchart showing steps taken to identify an optimal parking space for a vehicle entering the parking lot.

FIG. 6 is a flowchart showing steps taken to identify an optimal parking space for a vehicle entering the parking lot. FIG. 6 processing commences at 600 and shows the steps taken by a process that identify an optimal, or "best," parking space for a vehicle entering the parking lot. At step 610, the process initializes the current best space variable to a very large space size, such as the size of the entire parking lot, etc. At step 620, the process identifies the first available space in parking lot. Available parking lot spaces are identified by retrieving static parking lot data from memory area 430 that defines the lot's boundaries and rows, and the dynamic lot data from memory area 440, into which current vehicle parking data is stored, such as the vehicle's attributes, widths, clearance distances, etc. as well as the geographic location on the lot that each vehicle currently occupies. The process determines as to whether there are any spaces currently available on the parking lot (decision 625). If spaces are available, then decision 625 branches to the 'yes' branch to perform steps 630 through 690 that identify the optimal parking space for this vehicle. At step 630, the process retrieves the vehicle data of the parked vehicle on the driver's side of the currently identified parking space, with this data including the parked vehicle's passenger side clearance distance. This data is retrieved from dynamic lot data stored in memory area 440. At step 640, the process retrieves the vehicle data of the parked vehicle on the passenger's side of the currently identified parking space, with this data including the parked vehicle's driver side clearance distance. This data is also retrieved from dynamic lot data stored in memory area 440. The process first determines as to whether the vehicle entering the parking lot will fit in the currently identified space given the other vehicles' clearance distances as well as the vehicle enter the lot's clearance distances (decision 650). If the vehicle entering the parking lot fits in the currently identified space, then decision 650 branches to the 'yes' branch to perform decision 660. On the other hand, if the vehicle entering the parking lot will not fit in the currently identified space, then decision 650 branches to the 'no' branch bypassing decision 660 and step 670. At decision 660, the process determines whether the currently identified space size is smaller than the current best available space size. If the currently identified space size is smaller than the current best available space size, then decision 660 branches to the 'yes' branch to perform step 670 that stores this space as the current best space in memory area 525. On the other hand, if the currently identified space size is not smaller than the current best available space size, then decision 660 branches to the 'no' branch bypassing step 670. The process determines as to whether there are more spaces to in the parking lot to analyze to find the optimal parking space for this vehicle (decision 675). If there are more spaces to in the parking lot to analyze, then decision 675 branches to the 'yes' branch which loops back to step 620 to identify and analyze the next available space in the parking lot. This looping continues until there are no more spaces to in the parking lot to analyze, at which point decision 675 branches to the 'no' branch exiting the loop, at which point step 680 is performed to update the dynamic lot data with this vehicle's data and selected space from the best available space stored in memory area 525. FIG. 6 processing thereafter returns to the calling routine (see FIG. 5) at 690. Returning to decision 625, if no space is available in the parking lot, then decision 625 branches to 'no' branch whereupon processing returns to the calling routine (see FIG. 5) with an error indicating that the parking lot is full.

Figure 7:
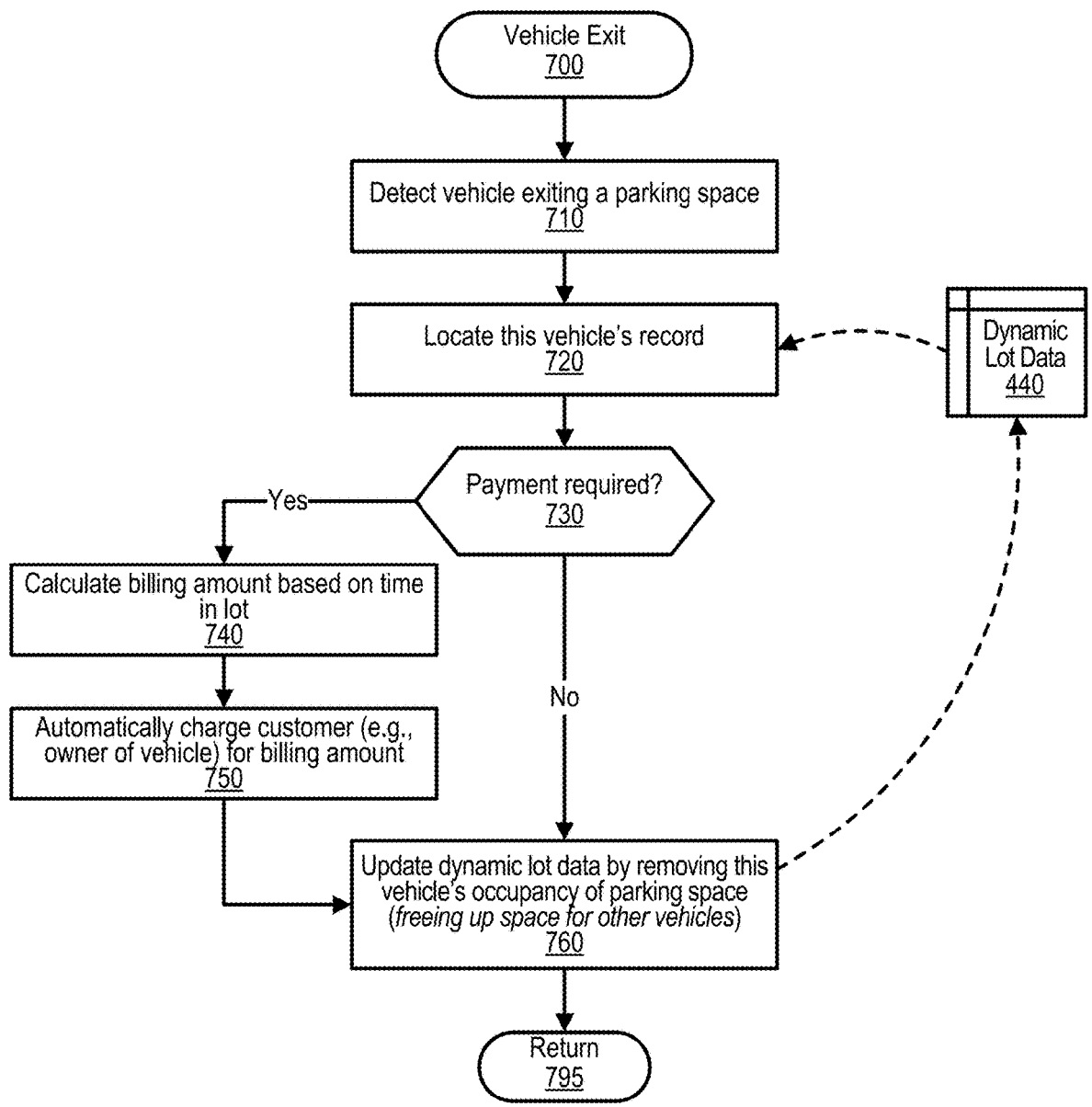
FIG. 7 is a flowchart showing steps taken when a vehicle exits the parking lot.

FIG. 7 is a flowchart showing steps taken when a vehicle exits the parking lot. FIG. 7 processing commences at 700 and shows the steps taken by a process that is performed when a vehicle exits the parking lot. At step 710, the process detects that a vehicle exiting a parking space. At step 720, the process locates the vehicle's data in memory area 440. In one embodiment, the data is retrieved based upon the geographic location of the space that has been vacated by the vehicle. The process determines as to whether a payment required, such as at a parking lot that charges for the amount of time the vehicle is parked (decision 730). If payment required, then decision 730 branches to the 'yes' branch to perform steps 740 and 750. On the other hand, if payment is not required, then decision 730 branches to the 'no' branch bypassing steps 740 and 750. At step 740, the process calculates the billing amount based on the amount of time that the vehicle was parked in the parking lot. At step 750, the process automatically charges customer, such as the owner of vehicle, for billing amount. The charge may be to a credit card on file or to an account maintained by the parking lot operator. At step 760, the process updates the dynamic lot data stored in memory area 440 by removing this vehicle's occupancy of the parking space. This action frees up the parking space for other vehicles that may enter the parking lot. FIG. 7 processing thereafter returns to the calling routine (see FIG. 4) at 795.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
    automatically locating an available parking space from a plurality of parking spaces;
    retrieving a first clearance distance corresponding to a first parked vehicle parked in a first adjacent parking space to the located parking space, wherein the first clearance distance is based on whether the first parked vehicle is manually driven; and
    transmitting an instruction to a self-driving vehicle to park in the located parking space and leaving the first clearance distance between the self-driving vehicle and the first parked vehicle, wherein the self-driving vehicle is selected from a plurality of self-driving vehicles.

2. The machine-implemented method of claim 1 further comprising:
    retrieving a second clearance distance corresponding to a second parked vehicle located in a second adjacent parking space to the identified parking space; and
    transmitting the instruction to the self-driving vehicle to park in the identified parking space and leaving the first clearance distance between the self-driving vehicle and the first parked vehicle and the second clearance distance between the self-driving vehicle and the second parked vehicle.

3. The machine-implemented method of claim 1 further comprising:
    determining that the first parked vehicle is also a self-driving vehicle; and
    setting the first clearance distance to a nominal distance in response to the determination.

4. The machine-implemented method of claim 1 wherein the locating of the available parking space further comprises:
    retrieving a vehicle clearance corresponding to the self-driving vehicle;
    locating a plurality of available parking spaces; and
    selecting the identified available parking space based on an overall parking width that is based on the vehicle clearance, the first clearance distance, and a second clearance distance corresponding to a second parked vehicle located in a second adjacent parking space to the identified available parking space.

5. The machine-implemented method of claim 1 further comprising:
    identifying that the first parked vehicle is a manually-driven vehicle and that the first adjacent parking space is adjacent to a driver's side of the self-driving and further identifying that the first parked vehicle lacks a passenger-side exit requirement; and
    setting the first clearance distance to a human-error allotment distance that is less than a vehicle door-opening distance in response to the identifying.

6. The machine-implemented method of claim 1 further comprising:
    identifying that the first parked vehicle is a manually-driven vehicle and that an exit requirement exists between the first parked vehicle and the available parking space; and
    setting the first clearance distance to a vehicle door-opening distance in response to the identifying.

7. The machine-implemented method of claim 1 wherein the locating, retrieving, and transmitting are performed by a mixed use parking lot manager process.

8. An information handling system comprising: one or more processors; a memory accessible by at least one of the processors; one or more object sensors, accessible by at least one of the processors, that sense vehicles parked in a plurality of parking spaces; a wireless communications adapter accessible by at least one of the processors; and a set of instructions stored in the memory and executed by at least one of the processors to: automatically locate, via the object sensors, an available parking space from a plurality of parking spaces, and storing the available parking space in the memory; retrieve a first clearance distance corresponding to a first parked vehicle parked in a first adjacent parking space to the located parking space, wherein the first clearance distance is based on whether the first parked vehicle is manually driven; and transmit, via the wireless communications adapter, an instruction to a self-driving vehicle to park in the located parking space and leaving the first clearance distance between the self-driving vehicle and the first parked vehicle, wherein the self-driving vehicle is selected from a plurality of self-driving vehicles.

9. The information handling system of claim 8 wherein the instructions are further executed by the processors to:
    retrieve a second clearance distance corresponding to a second parked vehicle located in a second adjacent parking space to the identified parking space; and
    transmit the instruction to the self-driving vehicle to park in the identified parking space and leaving the first clearance distance between the self-driving vehicle and the first parked vehicle and the second clearance distance between the self-driving vehicle and the second parked vehicle.

10. The information handling system of claim 8 wherein the instructions are further executed by the processors to:
    determine that the first parked vehicle is also a self-driving vehicle; and
    set the first clearance distance to a nominal distance in response to the determination.

11. The information handling system of claim 8 wherein the location of the available parking space is performed by instructions that are further executed by the processors to:
    retrieve a vehicle clearance corresponding to the self-driving vehicle;
    locate a plurality of available parking spaces; and
    select the identified available parking space based on an overall parking width that is based on the vehicle clearance, the first clearance distance, and a second clearance distance corresponding to a second parked vehicle located in a second adjacent parking space to the identified available parking space, wherein the overall parking width minimizes wasted space in excess of the overall parking width.

12. The information handling system of claim 8 wherein the instructions are further executed by the processors to:
   identify that the first parked vehicle is a manually-driven vehicle and that the first adjacent parking space is adjacent to a driver's side of the self-driving and further identifying that the first parked vehicle lacks a passenger-side exit requirement; and
   set the first clearance distance to a human-error allotment distance that is less than a vehicle door-opening distance in response to the identifying.

13. The information handling system of claim 8 wherein the instructions are further executed by the processors to:
   identify that the first parked vehicle is a manually-driven vehicle and that an exit requirement exists between the first parked vehicle and the available parking space; and
   set the first clearance distance to a vehicle door-opening distance in response to the identifying.

14. The information handling system of claim 8 wherein the instructions that locate, retrieve, and transmit are performed by a mixed use parking lot manager process.

15. A computer program product comprising: a non-transitory computer readable storage medium comprising a set of computer instructions, the computer instructions effective to: automatically locate, via one or more object sensors, an available parking space from a plurality of parking spaces, and storing the available parking space in a memory; retrieve a first clearance distance corresponding to a first parked vehicle parked in a first adjacent parking space to the located parking space, wherein the first clearance distance is based on whether the first parked vehicle is manually driven; and transmit, via a wireless communications adapter, an instruction to a self-driving vehicle to park in the located parking space and leaving the first clearance distance between the self-driving vehicle and the first parked vehicle, wherein the self-driving vehicle is selected from a plurality of self-driving vehicles.

16. The computer program product of claim 15 wherein the instructions are further executed by the processors to:
   retrieve a second clearance distance corresponding to a second parked vehicle located in a second adjacent parking space to the identified parking space; and
   transmit the instruction to the self-driving vehicle to park in the identified parking space and leaving the first clearance distance between the self-driving vehicle and the first parked vehicle and the second clearance distance between the self-driving vehicle and the second parked vehicle.

17. The computer program product of claim 15 wherein the instructions are further executed by the processors to:
   determine that the first parked vehicle is also a self-driving vehicle; and
   set the first clearance distance to a nominal distance in response to the determination.

18. The computer program product of claim 15 wherein the location of the available parking space is performed by instructions that are further executed by the processors to:
   retrieve a vehicle clearance corresponding to the self-driving vehicle;
   locate a plurality of available parking spaces; and
   select the identified available parking space based on an overall parking width that is based on the vehicle clearance, the first clearance distance, and a second clearance distance corresponding to a second parked vehicle located in a second adjacent parking space to the identified available parking space, wherein the overall parking width minimizes wasted space in excess of the overall parking width.

19. The computer program product of claim 15 wherein the instructions are further executed by the processors to:
   in response to identifying that the first parked vehicle is a manually-driven vehicle and that the first adjacent parking space is adjacent to a driver's side of the self-driving and further identifying that the first parked vehicle lacks a passenger-side exit requirement, setting the first clearance distance to a human-error allotment distance that is less than a vehicle door-opening distance in response to the identifying;
   in response to identifying that the first parked vehicle is a manually-driven vehicle and that an exit requirement exists between the first parked vehicle and the available parking space, setting the first clearance distance to a vehicle door-opening distance in response to the identifying; and
   in response to identifying that the first parked vehicle is also a self-driving vehicle, setting the first clearance distance to a nominal distance in response to the determination.

20. The computer program product of claim 15 wherein the instructions that locate, retrieve, and transmit are performed by a mixed use parking lot manager process.

* * * * *